United States Patent
Sah et al.

(10) Patent No.: US 7,217,221 B2
(45) Date of Patent: May 15, 2007

(54) METHOD FOR ACTIVE ENGINE STOP OF A HYBRID ELECTRIC VEHICLE

(75) Inventors: Jy-Jen F. Sah, West Bloomfield, MI (US); Gregory A. Hubbard, Brighton, MI (US); Adam C. Bennett, McCordsville, IN (US); Todd M. Steinmetz, Indianapolis, IN (US); Michael D. Foster, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 229 days.

(21) Appl. No.: 10/846,144

(22) Filed: May 14, 2004

(65) Prior Publication Data
US 2005/0255968 A1 Nov. 17, 2005

(51) Int. Cl.
*B60K 1/02* (2006.01)
(52) U.S. Cl. .................................. 477/3; 477/4; 477/5
(58) Field of Classification Search ................. 477/3, 477/4, 5, 118; 290/40 C
See application file for complete search history.

(56) References Cited

U.S. PATENT DOCUMENTS

| | | | |
|---|---|---|---|
| 5,931,757 A | 8/1999 | Schmidt | |
| 6,278,195 B1* | 8/2001 | Yamaguchi et al. | 290/40 A |
| 6,500,089 B2* | 12/2002 | Lasson et al. | 477/3 |
| 6,558,290 B2* | 5/2003 | Phillips et al. | 477/5 |
| 6,832,148 B1* | 12/2004 | Bennett et al. | 701/54 |
| 2003/0004031 A1* | 1/2003 | Philips et al. | 477/5 |
| 2003/0183467 A1* | 10/2003 | Kozarekar | 188/380 |

\* cited by examiner

*Primary Examiner*—David D. Le
(74) *Attorney, Agent, or Firm*—Christopher DeVries

(57) ABSTRACT

A method for providing an active engine stop of the engine of a hybrid electric vehicle. The method utilizes the electric machine to oppose and rapidly stop the rotation of the engine at a controlled rate. The method includes the calculation of an input speed reduction trajectory using the engine speed when the active engine stop request is made and a predetermined speed reduction interval. The speed reduction interval is less than a time from the active stop request to the shutoff command to the electric machine The method provides rapid deceleration of the engine, particularly through the powertrain resonance speed, reducing the amount of vibration energy dissipated through the powertrain and chassis. The method removes the electric machine torques from the engine prior to achieving zero engine speed in order to avoid imparting a negative engine speed or counter-rotation of the engine.

26 Claims, 8 Drawing Sheets

METHOD FOR ACTIVE ENGINE STOP OF A HYBRID ELECTRIC VEHICLE

TECHNICAL FIELD

The present invention generally relates to a method of operating a hybrid electric vehicle. More particularly, the method relates to an operating mode for controlling a vehicle powertrain system of a hybrid electric vehicle. Most particularly, the method relates to an operating mode for providing an active engine stop for a hybrid electric vehicle.

BACKGROUND OF THE INVENTION

An HEV is a vehicle that has a propulsion system that consists of at least one electric motor or electric machine in combination with at least one other power source. Typically, the other power source is a gasoline or diesel engine. There are various types of HEVs depending on how the electric motor(s) and other power source(s) are combined with one another in order to provide propulsion for the vehicle, including series, parallel and compound HEVs.

Various hybrid powertrain architectures are known for managing the input and output torques of various propulsion systems in HEVs, most commonly internal combustion engines and electric machines. Series hybrid architectures are generally characterized by an internal combustion engine driving an electric generator which in turn provides electrical power to an electric drivetrain and to an energy storage system, comprising a battery pack. The internal combustion engine in a series HEV is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack.

Parallel HEV architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel HEV powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions (i.e. input split, output split and compound split configurations) thereby enabling high-torque continuously variable speed ratios, electrically dominated launches, regenerative braking, engine off idling, and two-mode operation.

Essentially all transmissions have a spring damper located between the engine and transmission. Although it is commonly just called a "damper," it is actually built with springs that can be designed to dissipate energy. The spring damper decouples the rotating inertia of the engine from the rotating inertia of the transmission, thereby providing some level of isolation from high frequency oscillations (e.g. engine firing pulses are attenuated as they pass through the damper into the transmission). When an engine is "keyed-off", the engine is passively stopped as the rotational energy is dissipated due to frictional losses and the operation of the spring damper.

The design of the spring damper is constrained by the mechanical packaging of the springs themselves. The spring design must meet conflicting criteria. The springs must be stiff enough (large spring constant, K) to accept the maximum torque of the engine within their free travel length. However, long springs can encounter problems in buckling and are very difficult to package. And the natural frequency of the system must be significantly lower than the desired idle speed (e.g., by about $1/\sqrt{2}$ for attenuation), but the high stiffness (K) tends to drive the natural frequency higher (e.g., by $\sqrt{K/M}$) relationship). A key difference between certain EVT transmissions and other transmissions is that the engine is continuously coupled through a spring damper to the transmission and its large inertias. There is no decoupling starting clutch (as in a manual transmission) or torque converter (as in an automatic transmission). These large inertias produce significant vibrational energy as the engine and transmission pass through a resonant frequency associated with the engine speed (e.g. the resonance speed of an compression engine/spring damper/transmission system is approximately 400 rpm for a six cylinder engine which permits sufficient attenuation by idle speed (i.e., 600 rpm and higher)), thereby affecting operator and passenger feel and perceived vehicle performance. Certain EVTs have the possibility of actively applying an opposing torque to the engine using one or more electric motors.

Therfore, it is desirable to develop operating modes for EVT powertrain systems that may be used to provide an active engine stop and shorten the time required to transition the engine through the powertrain resonant speed.

SUMMARY OF THE INVENTION

This present invention is a method of providing an active engine stop mode of operation for a vehicle powertrain system comprising an electric machine that is operatively and selectively coupled to an engine and transmission, the system having a system controller for controlling the vehicle powertrain system which is in signal communication with and adapted to provide an output torque command to an engine controller for controlling the output torque of the engine, wherein the electric machine is adapted to provide an output torque to oppose rotation of the engine and provide an active engine stop. The method includes the steps of: initiating an active engine stop request; defueling the engine in response to the active engine stop request and maintaining a rotation of the engine and a predetermined engine speed using the electric machine; determining a desired rate of reduction of the engine speed from the predetermined engine speed; and applying an opposing torque using the electric machine to oppose the rotation of the engine and reduce the engine speed consistent with the desired rate of reduction of the engine speed. The method is preferably implemented as a computer control algorithm. The method uses the electric motors to actively drive the engine to a stop.

This method provides the benefit of improving durability of the driveline and improving smoothness during the engine stop by limiting the amount of vibration energy dissipated into the powertrain and vehicle chassis. The invention is particularly advantageous in that it may be used with many different types and sizes of engines having many different base idle speeds. It permits a plug and play implementation of different engines without the need to tailor the powertrain system to obtain acceptable noise, vibration and harshness performance.

BRIEF DESCRIPTION OF THE DRAWINGS

The present invention may be more fully understood from the detailed description given here below, the appended claims, and the accompanying drawings in which:

DESCRIPTION OF THE PREFERRED EMBODIMENT

Figure 1:
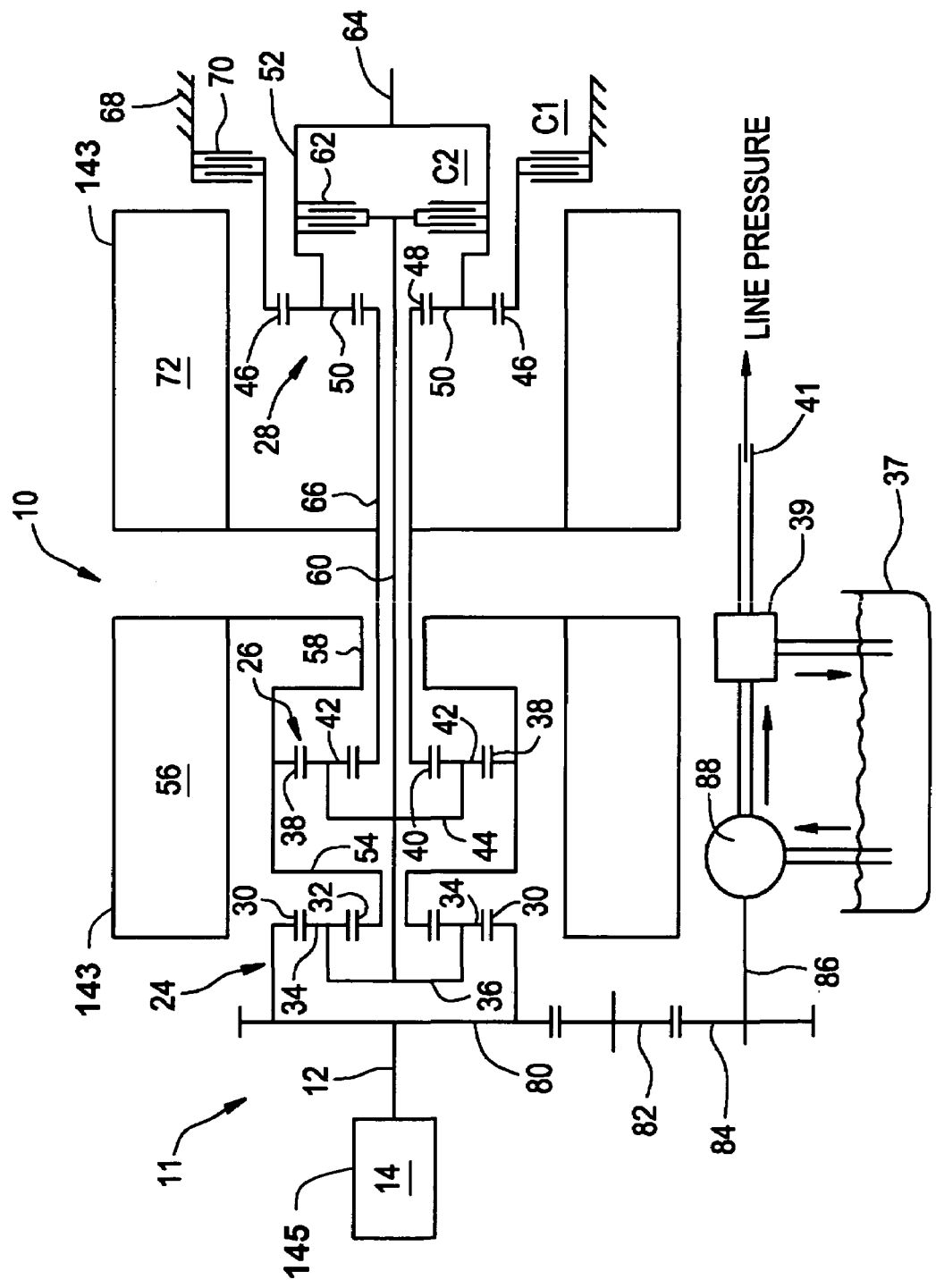
FIG. 1 is a mechanical hardware schematic representation of one preferred form of a two-mode, compound-split, electrically variable transmission particularly suited to the implementation of the present invention.
Figure 2:
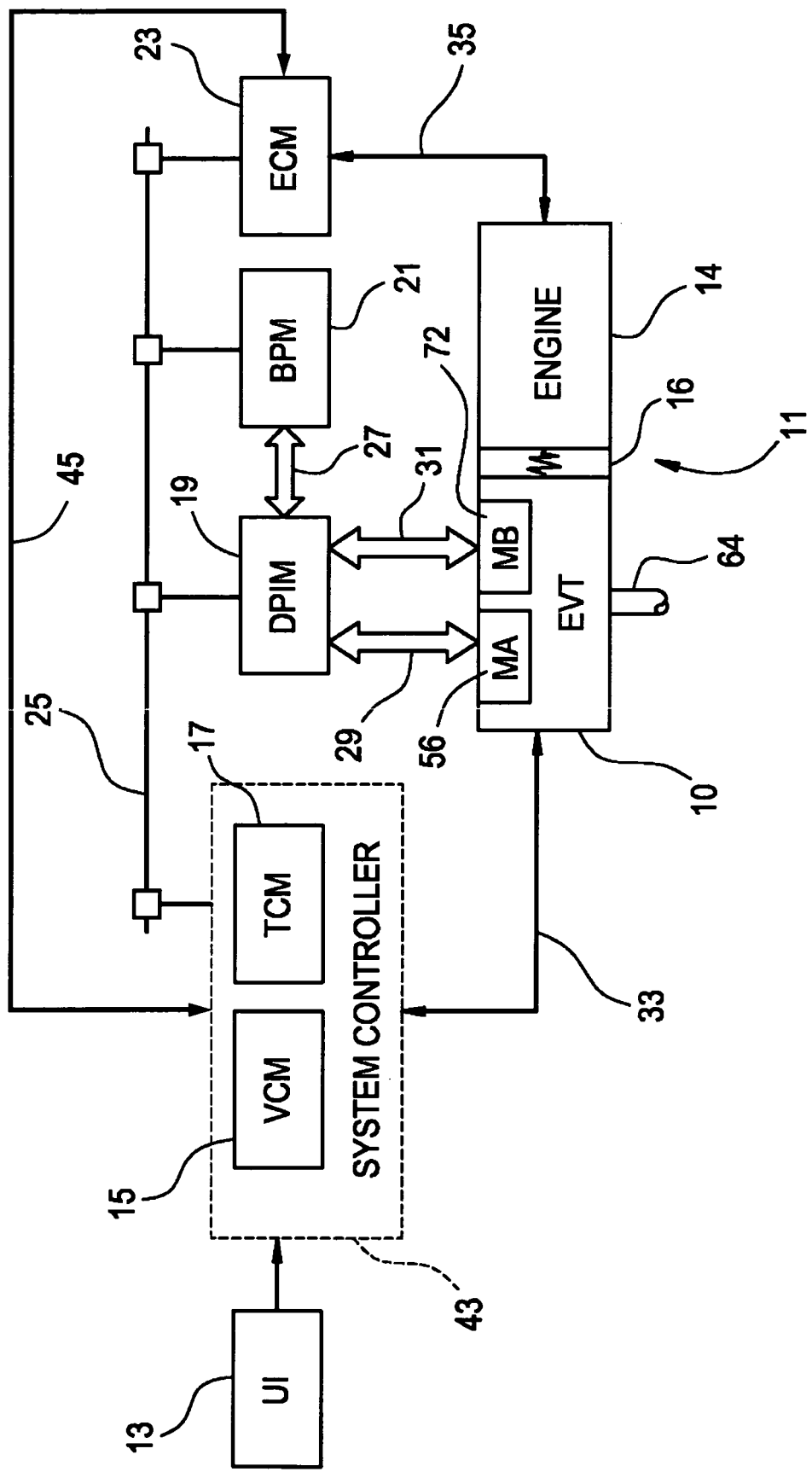
FIG. 2 is an electrical and mechanical schematic of a preferred system architecture for the hybrid powertrain disclosed herein.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those FIGS., the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporated, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First electric machine or motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second electric machine or motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e., the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (with the) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well-known torque-based controls for engine 14 in response to a torque command Te_cmd provided by the EVT control system. Such engines electronics, controls and quantities are generally well known to those skilled in the art and further detailed exposition thereof is not required herein As should be apparent from the foregoing description, the EVT 10 selectively receives power from the engine 14. As will now be explained with continued reference to FIG. 2, the EVT also receives power from an electric energy storage device or system 20 (ESS), such as one or more batteries in battery pack module (BPM) 21. As used herein, reference to a battery includes not only a single battery, also includes any combination of single or multiple batteries, or cells thereof, into a battery pack or array, or a plurality of battery packs or arrays. BPM 21 is preferably a parallel array of battery packs, each of which comprises a plurality of batteries. As used herein, the term battery generally refers to any secondary or rechargeable battery, but those comprising lead/acid, nickel/metal hydride (Ni/MH), or Li/ion or polymer cells are preferred. Other electric energy storage devices that have the ability to store electric power through charging and dispense electric power through discharging, such as super capacitors or ultracapacitors, may be used in place of, or in combination with, the batteries without altering the concepts of the present invention. The BPM 21 is high voltage DC (e.g., about 650 V in an exemplary embodiment) coupled to dual power inverter module (DPIM) 19 via DC lines 27. Current is transferable to or from the BPM 21 in accordance with whether the BPM 21 is being charged or discharged. BPM 21 also comprises a conventional microprocessor based controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O), temperature sensors and appropriate signal conditioning and buffer circuitry necessary to monitor the state of the battery and transmit this information to other portions of the control system for use in the overall control of the vehicle, such as VCM 15 and TCM 17. This includes sensing, processing, calculating and otherwise monitoring various parametric information regarding the state or condition of the battery, such as its temperature, current and voltage while charging and discharging, and state of charge (SOC), which comprises the instantaneous amount of energy stored in the battery expressed as a percentage of its total energy storage capacity. This also includes is a transmitting the information concerning these parameters to other portions of the vehicle control system, including the VCM 15 and TCM 17, for use in conjunction with control algorithms which make use of battery parametric information, such as those used to establish SOC-related charge and discharge limits, amp-hour/hour or energy throughput limits, temperature limits or other battery-related control functions.

DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, $M_A$ and $M_B$ are three-phase AC machines and the inverters comprise complementary three-phase power electronics. Individual motor speed signals Na and Nb for $M_A$ and $M_B$, respectively, are also derived by the DPIM 19 from the motor phase information or in conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, system controller 43 is shown generally in bidirectional interface with EVT via aggregate line 33. System controller 43 may also incorporate any number of discrete signal and sensor lines for signal communication between system controller 43 and any number of the other controllers, sensors or other devices. With regard to the present invention, it is preferred that system controller 43 is in signal communication with ECM 23 via signal line 45 for transmitting an discrete engine on/off signal in addition to communication between these devices via communication bus 25. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M^B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e., system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
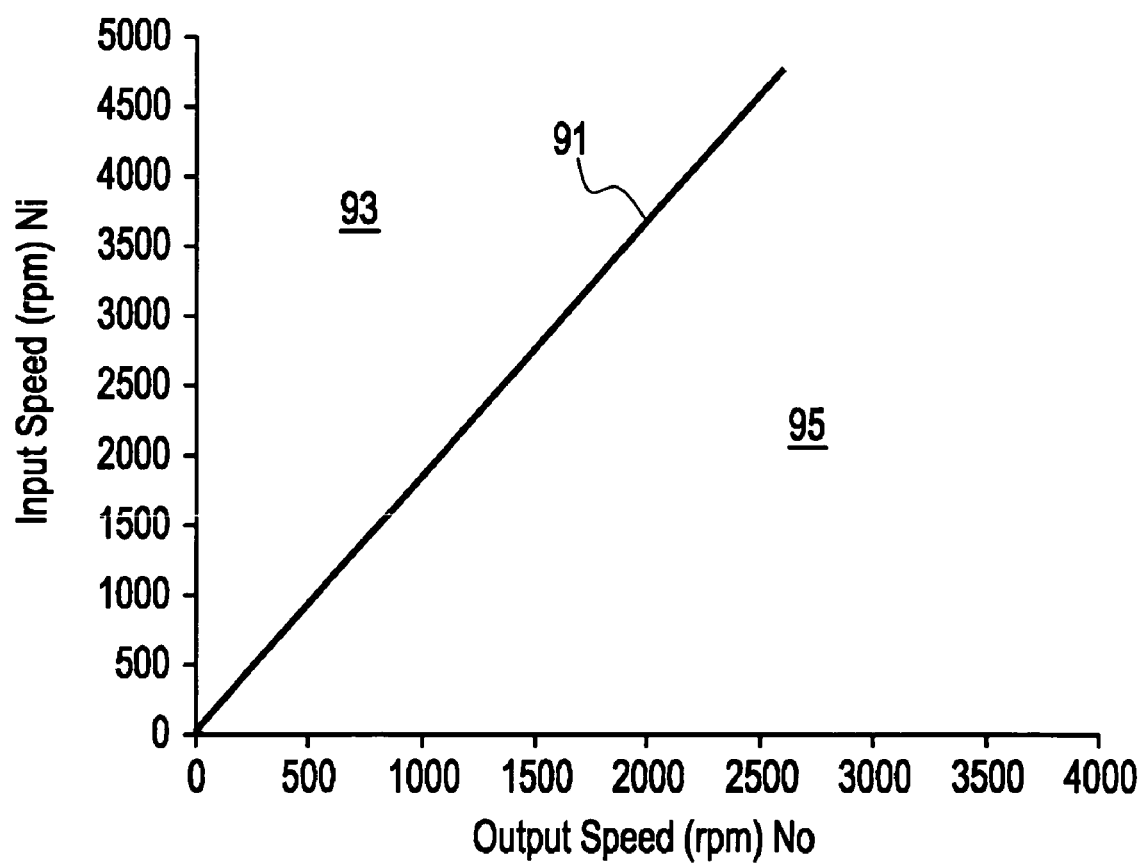
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be affected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g., mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g., mass, size, cost, inertial capabilities, etc.) to the high speeds of region 95. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

As a starting point for the present control, various powertrain parameters are measured or otherwise predetermined. Output speed, No, and input speed, Ni, are preferably derived from sensed and filtered signals. Motor speeds Na and Nb are known through sensing, calculated with known coupling constraints of the EVT, or derived through the motor control phase information. Input acceleration, Ni_dot, is preferably a desired rate of change of transmission input speed determined as taught in commonly assigned and co-pending U.S. Ser. No. 10/686,511 (Attorney Docket Number GP-304140). Output speed acceleration, No_dot, is preferably determined in accordance with sensed and filtered output speed, No, also as disclosed in commonly assigned and co-pending U.S. Ser. No. 10/686,511 (Attorney Docket Number GP-304140).

For each vehicle powertrain system, there generally exists one or more Newtonian coupling equations relating the output torque of the electric machine or machines to the vehicle dynamic parameters of the transmission, including Ni, No, Ti, To, No_dot, Ni_dot and Ncx_dot, where Ncx_dot is representative of the slip acceleration of a clutch "x" used to couple the electric machine to the other elements of vehicle powertrain system in accordance with the present invention. The following exemplary coupling constraint equation is known for the EVT described herein for calculating the motor A and motor B output torques:

$$\begin{bmatrix} Ta \\ Tb \end{bmatrix} = \begin{bmatrix} K_{11} & K_{12} & K_{13} & K_{14} \\ K_{21} & K_{22} & K_{23} & K_{24} \end{bmatrix} \begin{bmatrix} Ti \\ Ni\_dot \\ No\_dot \\ Nc1\_dot \end{bmatrix}$$

where
Ta is motor A speed;
Tb is motor B speed;
Ti is EVT input speed;
Ni_dot is EVT input acceleration;
No_dot is EVT output acceleration;
Nc1_dot is the C1 slip acceleration;
Kn is a 2×4 matrix of parametric values determined by the hardware gear and shaft interconnections and estimated hardware inertias applicable to the current drive range and represents what is commonly referred to as the plant model.

Figure 4A:
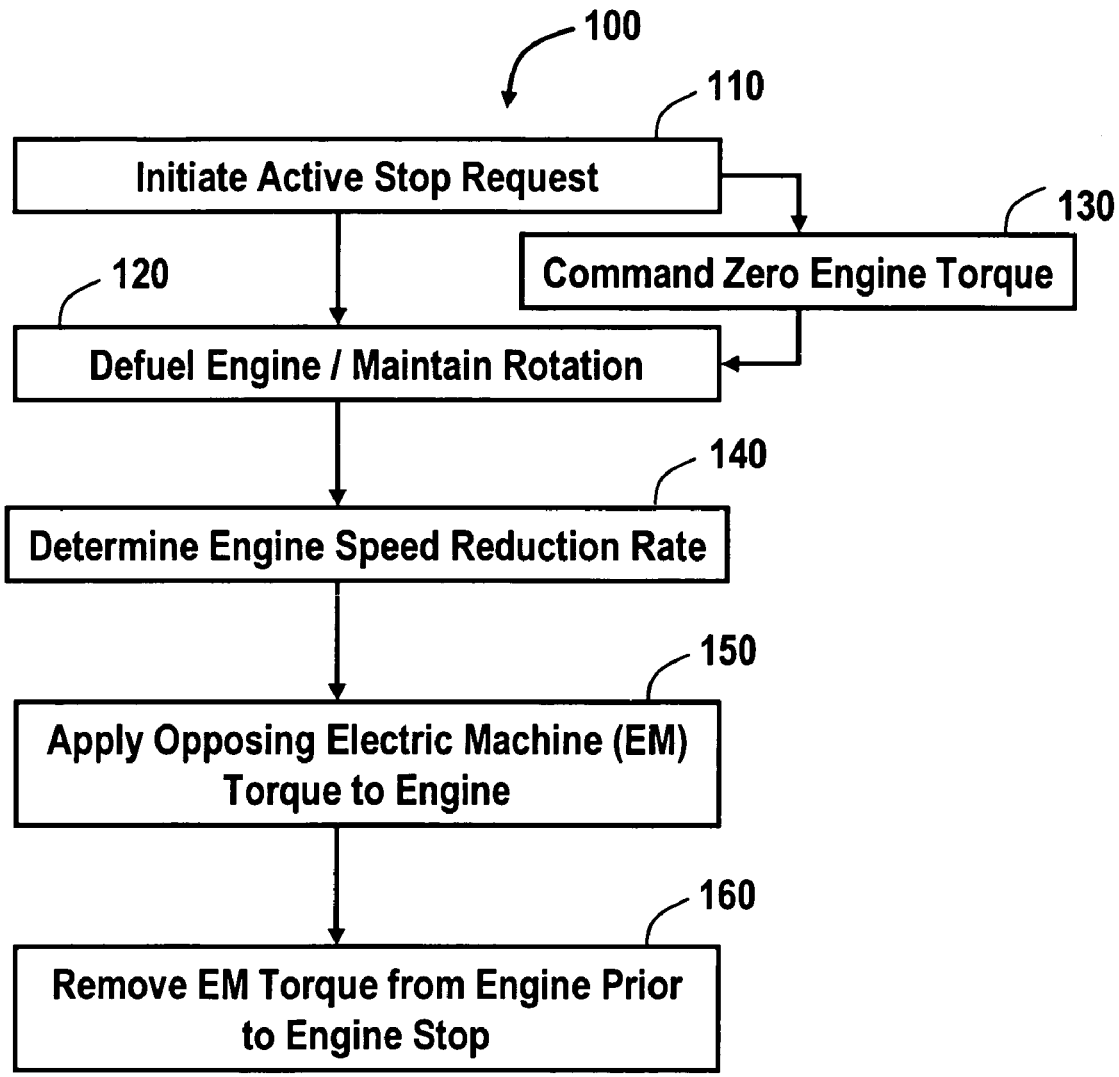
FIG. 4A is a flow chart illustrating steps of the method of the present invention.

Referring now to FIG. 4A, the present invention comprises a method 100 of providing an active engine stop mode of operation for a vehicle powertrain system comprising an electric machine that is operatively and selectively coupled to an engine and transmission, the system having a system controller for controlling the vehicle powertrain system which is in signal communication with and adapted to provide an output torque command to an engine controller for controlling the output torque of the engine, wherein the electric machine is adapted to provide an output torque to oppose rotation of the engine and provide an active engine stop, comprising the steps of: initiating 110 an active engine stop request; defueling 120 the engine in response to the active engine stop request and maintaining a rotation of the engine and a predetermined engine speed using the electric machine; determining 140 a desired rate of reduction of the engine speed from the predetermined engine speed; and applying 150 an opposing torque using the electric machine to oppose the rotation of the engine and reduce the engine speed consistent with the desired rate of reduction of the engine speed. The active engine stop request also preferably comprises sending 130 an engine output torque command for zero engine output torque. It is believed that method 100 may be implemented either in hardware, such as, for example, using various forms of hardwired logic and computational components, or in software, or in various combinations thereof. However, it is preferred that method 100 comprise a computer control algorithm which may be executed as computer code in one or more computers located in the vehicle, such as found in system controller 43. Method 100 is described in greater detail below.

An active engine stop mode of operation is a mode of operation of the vehicle powertrain system, such as vehicle powertrain system 11, where control actions are applied, preferably by one of the controllers of the vehicle powertrain system, such as system controller 43, to actively stop the rotation of the engine in response to an active engine stop request. This is in contrast to a passive stop of the engine as described above, wherein the rotational energy of the engine is dissipated by frictional losses and the action of the spring damper. An active engine stop is characterized by a more rapid rate of reduction of engine speed than occurs with a passive engine stop. For example, passive engine stops may take about 1.5–2 seconds and exhibit deceleration rates on the order of about −300 to −1000 rpm/sec, whereas active engine stops typically may be performed in about 0.5 seconds or less and exhibit deceleration rates on the order of about −1200 to −4000 rpm/sec. Active stops are particularly advantageous in that they permit rapid transition through the engine resonance speed (e.g., about 400 rpm depending on the particular engine, transmission and other factors). Active stops are also advantageous because actual rate of reduction may be actively controlled to a particular and uniform rate, rather than a non-uniform rate that is determined by the system components and which cannot easily be changed. The ability to achieve a uniform and controlled rate during the active engine stop also provides design flexibility in that it permits more rapid integration (i.e., a plug and play interchange) of different system components (i.e., different combinations of engines, transmissions, spring dampers, etc.) without the need for extensive characterization of the noise, vibration and harshness (NVH) characteristics of the various combinations of components with respect to the engine stop, particularly the characterization of the NVH performance of these combinations at the resonance speed of the powertrain system.

An active engine stop mode of operation may be utilized with many types of vehicle powertrain systems, particularly those comprising hybrid electric vehicles. Vehicle powertrain systems adapted for an active engine stop mode of operation will generally comprise an electric machine that is operatively and selectively coupled to an engine and transmission, and that is adapted to provide an output torque to oppose rotation of the engine. The system will also have a system controller for controlling the vehicle powertrain system which is in signal communication with and adapted to provide an output torque command to an engine controller for controlling the output torque of the engine. As shown in FIGS. 1–2 and the description above, vehicle powertrain system, such as powertrain system 11, may comprise a plurality of electric machines that are each operatively and selectively coupled to an engine and transmission through a corresponding clutch, wherein at least one of the plurality of electric machines is adapted to provide an output torque to oppose the rotation of the engine and provide an active engine stop.

Figure 4B:
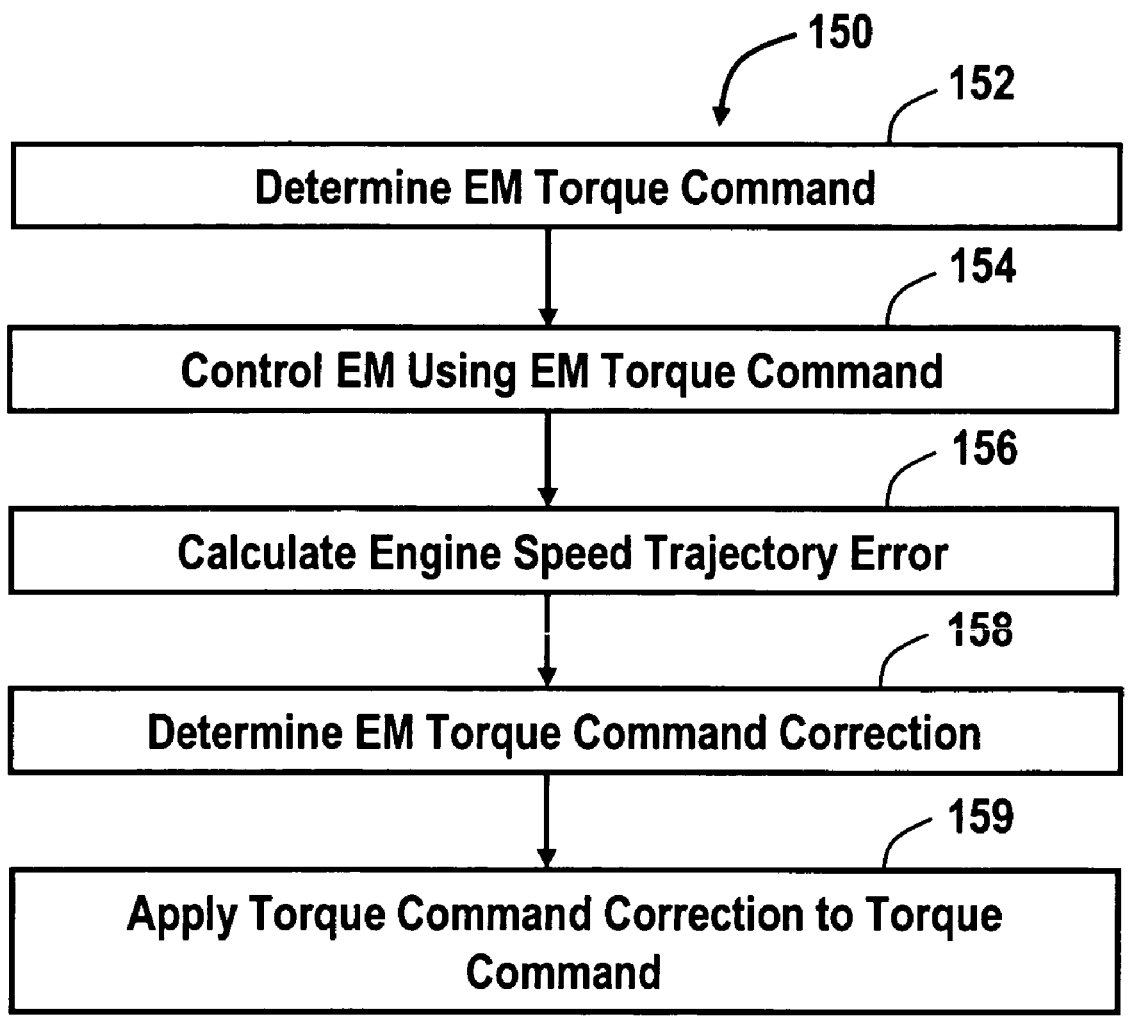
FIG. 4B is a flow chart illustrating steps associated with block 150 of FIG. 4A.
Figure 5:
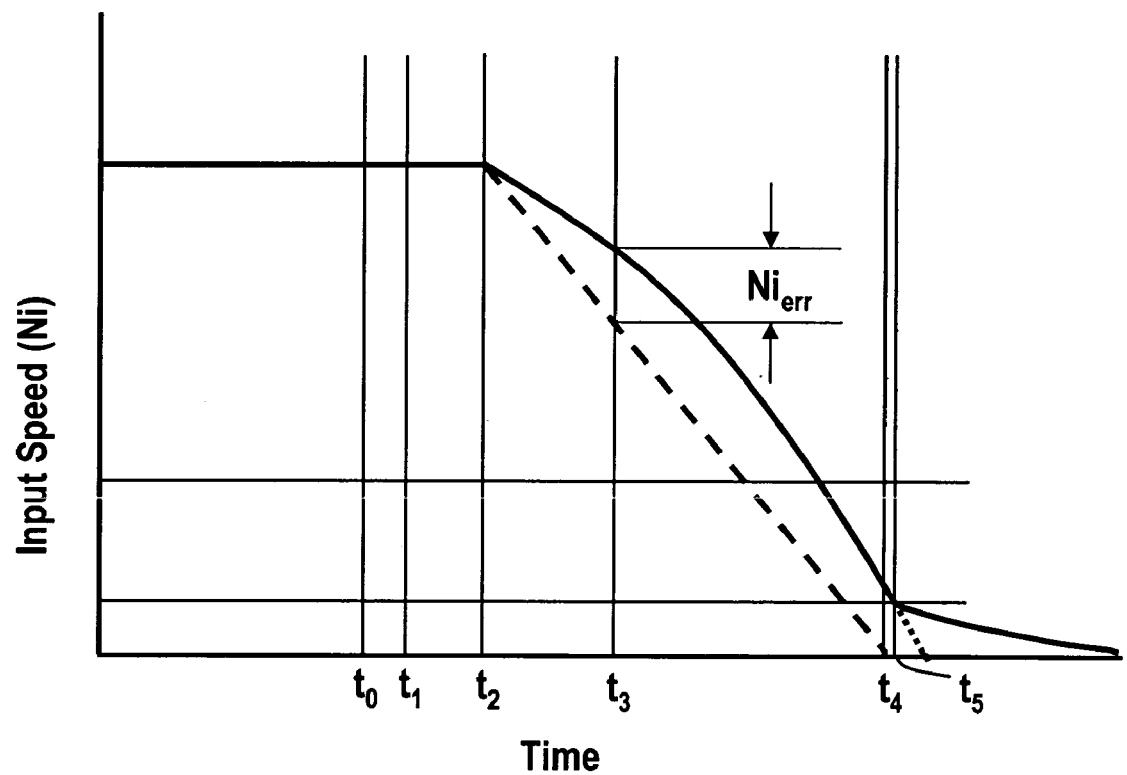
FIG. 5 is a plot of input speed as a function of time associated with the method of the present invention.

An active engine stop request is an input to the system, perferably a signal input to a controller, such as system controller 43, indicating that an active stop of the engine is requested. When the active engine stop mode embodied in method 100 is incorporated into a vehicle powertrain system, such as powertrain system 11, it is preferred that all requests to shut off the engine be active engine stop requests. While it is possible and generally preferable to design a powertrain system to implement both passive engine stop requests (i.e., a stop using only a spring damper, frictional losses, and other passive elements) and active requests, such as is illustrated herein with respect to powertrain system 11, it is believed that the use of active engine stop will be preferred for most engine stop requests. The passive engine stop may be used then primarily as a back-up engine stop mechanism in the event that the active engine stop is not available. The signal input to controller may be a signal in response to a keyswitch actuation resulting from a "key-off" action by the operator, as is well-known. The keyswitch actuation, such as a key-off, sends a key-off signal to a controller, such as system controller 43. This key-off signal comprises the active engine stop request. In another embodiment, the input to the controller comprising the active engine stop request may comprise a signal determined automatically by the controller, such as system controller 43, or another controller in the system, in response to a predetermined engine stop parameter or condition. A predetermined engine stop parameter is any parameter or condition associated with the vehicle powertrain system for which an active stop of the engine may be associated or scheduled. For example, an active engine stop may be associated with one or more system parameters, such as vehicle speed or transmission output speed while in a silent mode or condition of operation, or in response to a signal input from a switch associated with the vehicle condition, such as a switched signal that is adapted to provide a door open indication, which may also be associated with a silent mode of operation. Further details of an exemplary embodiment of an active engine stop parameter or condition may be found in related, co-pending, commonly assigned U.S. Ser. No. 10/686,015 (Attorney Docket GP-304211) filed on Oct. 14, 2003, which is hereby incorporated herein by reference in its entirety. Referring to FIGS. 4A–5, the step of initiating 110 an active engine stop request may be any action to initiate an active stop request, including all manner of manual actions determined by an operator and automatic actions initiated by one or more controllers to affect an engine stop request. In one embodiment, initiating 110 may comprise a manual input from an operator, such as the actuation of a keyswitch by the operator, such as a keyswitch actuation in response to a "key-off" action by the operator. In another embodiment, initiating 110 of the active engine stop request may comprise an automatic or programmed input of an engine stop parameter to a controller, such as system controller 43, wherein the controller is adapted to initiate an active engine stop automatically in response to the value or condition of the engine stop parameter. Referring to FIG. 5, the time associated with initiating 110 the active engine stop request is designated as time, $t_0$, as indicated by the associated reference line.

Method 100 also includes a step of defueling 120 the engine in response to the active engine stop request and maintaining a rotation of the engine and a predetermined engine speed using the electric machine. Defueling 120 the engine, such as engine 14, may be accomplished by any of a number of well-known means. Referring to FIGS. 1 and 2, defueling 120 may be controlled by ECM 23 in response to or in conjunction with a step of sending 130 an engine output torque command, Te_cmd, for zero engine output torque to ECM 23 from system controller 43 over communication bus 25. The system controller may also preferably remove an "engine on" signal over discrete signal line 45 that is adapted to provide an "on/off" signal to engine 14. The control commands associated with defueling 120 and sending 130 an engine output torque command may be performed using any of a number of well-known means including various well-known communication standards and protocols. In the case of powertrain system 11, such control commands are preferably performed in accordance with Society of Automotive Engineers standard J1939. Referring to FIG. 5, the time associated with defueling 120 and sending 130 is illustrated generally as time $t_1$, as indicated by the associated reference line, as they generally occur nearly simultaneously. However, as a matter of design choice, these steps may also be taken at different times (not shown). It is also generally preferred to perform the step of defueling 120 for a predetermined defueling interval prior to proceeding with subsequent steps of method 100, excepting the step of sending 130 an engine output torque command for zero engine output torque. The predetermined defueling interval is preferably selected to allow any remaining fuel to be consumed and to permit the engine output torque to be reduced to near zero prior to implementing subsequent control actions. In this way, the output torque required from the electric machine in subsequent steps is also reduced. In one embodiment of the invention, the predetermined defueling interval was about 100 ms, but will vary according to factors associated with the engine, fueling system and other elements of the vehicle powertrain system. Referring to FIG. 5, the predetermined defueling interval is illustrated as the time interval between $t_1$ and $t_2$.

In conjunction with the command for zero engine output torque, the controller, such as system controller 43, also issues the necessary torque control commands to at least one of the electric machines to assume the control of the rotation of the engine. Generally, this assumption of control has been described herein as maintaining a rotation of the engine and a predetermined engine speed using the electric machine. The predetermined engine speed may be any desired rotational speed of the engine, however, it is preferred that the predetermined engine speed be the rotational speed of the engine corresponding to the time of initiating 110 the active engine stop request. The electric machine torque or torques necessary to maintain the predetermined engine speeed or input speed, Ni, may be calculated in the manner described herein. As described herein, the measured input speed of the system is available at all times to the controller which is adapted to implement method 100, such as system controller 43. Thus, at time to, the electric machine torque may be calculated using the relationship described herein. In the embodiment described herein, the values associated with the vehicle dynamic parameters used for this calculation include: Ni_dot equal to zero in order to maintain the current input speed, Ni, (engine speed) at time $t_0$; the value of Ti being selected or set to a value generally equal to or slightly greater than the value of the frictional losses associated with engine which are generally well characterized and may comprise a calibration value (i.e., sufficient to maintain the engine rotation); the value of No_dot may be any suitable value, but is preferably selected as the current value at time $t_0$; and the value of Nc1_dot may be any suitable value, however, it is preferred that the value be selected as zero, such that clutch C1 may be rapidly engaged in response to a subsequent restart of the engine and engagement of powertrain system 11. It should be noted that the selected values for the vehicle dynamic parameters are the control settings for these parameters associated with the implementation of method 100 and the active engine stop operating mode.

Referring to FIGS. 4A–5, method 100 also includes a step of determining 140 a desired rate of reduction of the engine speed from the predetermined engine speed. This desired rate of reduction of engine speed or engine deceleration rate may be determined in any of a number of well-known methods. Determining 140 may, for example, include establishing a fixed deceleration as a calibration value or values. These values could be preselected as a function of engine speed (e.g., at time $t_0$). However, it is preferred that determining 140 comprise calculating an engine speed reduction trajectory for the engine. The engine speed reduction trajectory may be calculated in accordance with a relationship comprising:

$$\text{Engine Speed Reduction Rate} = -\frac{Ni(t_0)}{t_{SR1}}, \quad (1)$$

where:

$Ni(t_0)$ is the input speed of the transmission and the engine output speed at time $t_0$; and $t_{SR1}$ is the duration of a predetermined speed reduction interval.

Since the target engine speed at the end of the engine deceleration trajectory is preferably zero, the speed reduction is simply the negative of the difference of the predetermined engine speed and zero, which is simply the negative of the predetermined engine speed. If the target speed at the end of the trajectory is selected to be a speed other than the zero, determining 140 would comprise taking the difference of the predetermined speed and the target speed at the end of the deceleration trajectory. The predetermined speed reduction interval is preferably a fixed interval which may be stored as a calibration value in the controller, such as system controller 43. However, predetermined speed reduction interval may also be calculated if desired. Where the active engine stop is in response to a key-off action of an operator, the time during which the other elements of the system, including the controller and the electric machines, may be used to assist with the active engine stop is limited, as they are also in the process of being shutdown in accordance with various shutdown parameters associated with them. In the case of the electric machines, this is typically a fixed time interval (e.g., an interval determined by the manufacturer of the machine and its associated controls), such as, for example, about 2 seconds, whereafter the electric machine or machines receive a stop command. Therefore, it is desirable that the active engine stop be performed within an interval during which the system components used in the control, such as the controller and the electric machine, are available for use in conjunction with method 100. In one embodiment, the predetermined speed reduction interval was about 0.5 seconds. Referring to FIG. 5, the predetermined speed reduction interval is illustrated as the time interval between times $t_2$ and $t_4$.

Figure 6:
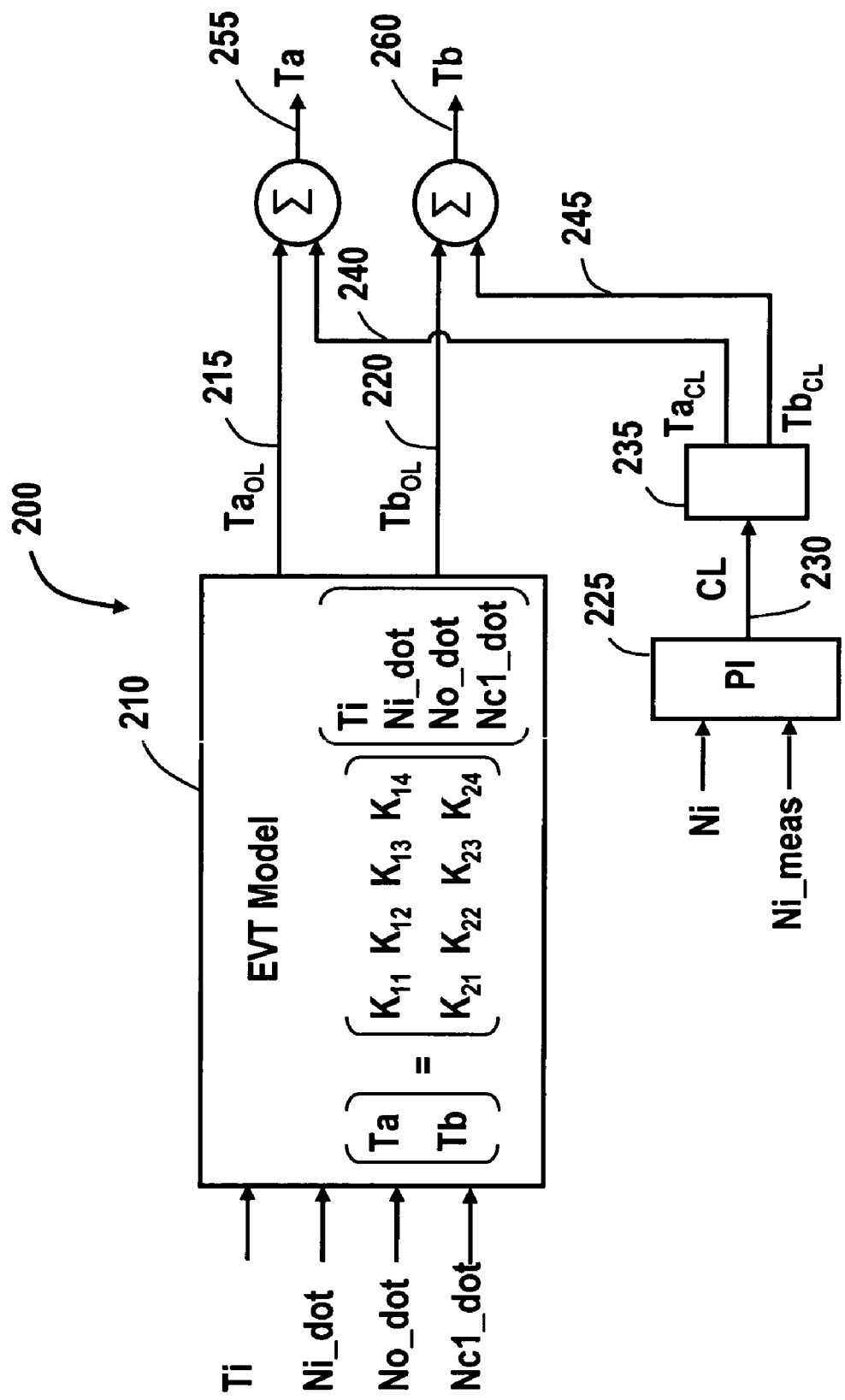
FIG. 6 is a block diagram of the calculation of output torque of the electric machine according to the method of the invention.

Referring to FIGS. 4A–8, method 100 also includes a step of applying 150 an opposing torque using the electric machine to oppose the rotation of the engine and reduce the engine speed consistent with the desired rate of reduction of the engine speed. Once the engine speed reduction trajectory has been determined, it is necessary to determine and command the necessary electric machine torques to achieve or obtain the desired deceleration rate of the engine. The step of applying 150 an opposing torque may be performed by the further steps including: determining 152 an electric machine output torque command necessary to obtain the engine speed trajectory as a function of a plurality of vehicle dynamic parameters; and controlling 154 the electric machine output torque using the electric machine output torque command. Referring to FIGS. 1, 2, 4A, 4B and 6, the step of determining 152 the electric machine output torque command necessary to obtain the engine speed trajectory as a function of a plurality of vehicle dynamic parameters is illustrated for a powertrain system, such as powertrain system 11, having two electric machines $M_A$ and $M_B$, as described herein. The electric machine torques may be determined using the appropriate coupling equation, such as Equation 1, as illustrated by block 210. The outputs of block 210 are the respective electric machine motor torques Ta and Tb, which are preferably applied as respective motor commands Ta_cmd and Tb_cmd. The step of controlling 154 preferably comprises open loop control of $M_A$ and $M_B$ using Ta_cmd and Tb_cmd, respectively. Ta_cmd and Tb_cmd are illustrated in FIG. 6 as $Ta_{OL}$ 215 and $Tb_{OL}$ 220, respectively. The coupling equation or equations will of course vary depending on the configuration of the powertrain system and its elements.

Figure 7:
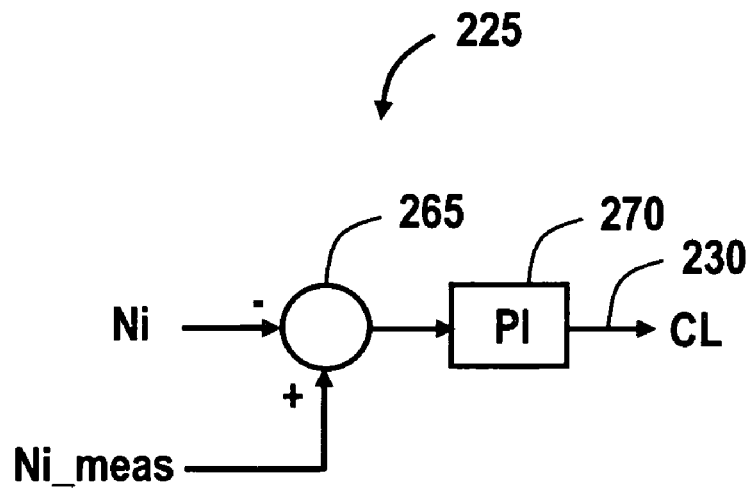
FIG. 7 is a block diagram of block 225 of FIG. 6.
Figure 8:
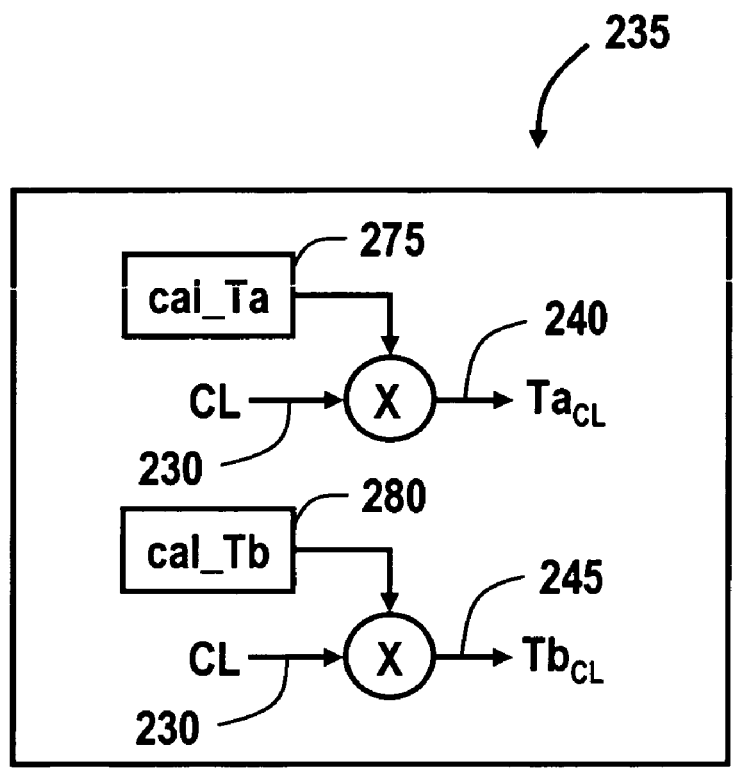
FIG. 8 is a block diagram of block 235 of FIG. 7.

Method 100 and the step of determining 140 the opposing motor torque also may comprise utilization of a closed loop correction of the electric machine torque as a function of the error between the input speed determined in accordance with the speed reduction trajectory and the actual or measured input speed. Referring to FIGS. 4B–8, this comprises the further steps of: calculating 156 an engine speed trajectory error using the engine speed from the speed trajectory and an actual engine speed; determining 158 an electric machine output torque command correction based on the trajectory error; and applying 159 the electric machine output torque command correction to the electric machine output torque command. The step of calculating 156 an engine speed trajectory error using the engine speed from the speed reduction trajectory and an actual engine speed is illustrated with regard to block 225 of FIG. 6, and is of course performed as a function of time, as illustrated in FIG. 5 with reference to a time $t_3$. Referring to FIGS. 6 and 7, Ni $E_{RR}$, is the difference between the actual input speed, Ni $M_{EAS}$, and the desired input speed associated with the input speed reduction trajectory, Ni, as illustrated by summing node 265. This engine speed trajectory error is preferably calculated in conjunction with each control loop of controller. Referring to FIGS. 6–8 and the step of determining 158 an electric machine output torque command correction based on the trajectory error, the engine speed trajectory error and may be fed to a proportional integral (PI) control portion 270 of the controller, such as system controller 43, wherein the error may be integrated using well-known methods for performing such control. This provides a closed loop term, CL 230, of the input speed trajectory error. This input speed trajectory error term may be used to determine an electric machine output torque command correction for each of the electric machines of the system, and as illustrated with respect to powertrain system 11 in block 235 as corrections for Ta_cmd and Tb_cmd, which are illustrated as $Ta_{CL}$ 240 and $Tb_{CL}$ 245, respectively. Referring to FIG. 8, closed loop term, CL 230 may be applied to empirically determined calibrations which are adapted to relate the magnitude of the input speed error to the respective incremental motor torque or torques necessary to reduce, and preferably to zero out the error. These are illustrated in FIG. 8 as cal_Ta 275 and cal_Tb 280 which may be multiplied by CL 230 to obtain closed loop corrections for $M_A$ and $M_B$, in the form of $Ta_{CL}$ 240 and $Tb_{CL}$ 245, respectively. Referring to FIG. 6 and the step of applying 159 the electric machine output torque command correction to the electric machine output torque command, the closed loop corrections for $M_A$ and $M_B$, in the form of $TA_{CL}$ 240 and $Tb_{CL}$ 245 may be applied to $Ta_{OL}$ 215 and $Tb_{OL}$ 220, respectively as illustrated to obtain corrected and more accurate values for Ta_cmd and Tb_cmd, which are illustrated respectively, as Ta 255 and Tb 260.

Referring to FIG. 5, method 100 may also include a step of removing 160 the opposing torque of the electric machine at an engine speed greater than zero engine speed. This step is intended to eliminate the possibility of overshoot in the control and imparting a negative speed to or counter-rotating the engine. This step may be performed by removing the electric machine output torques from the engine below a predetermined engine speed threshold and allowing the engine rotation to come to a stop at a slower rate based on the frictional torque losses associated with the engine, as illustrated in FIG. 5 with respect to time $t_5$. The predetermined engine speed threshold is preferably less than a resonance speed of the vehicle powertrain system, as described herein.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A method of providing an active engine stop mode of operation for a vehicle powertrain system comprising an electric machine that is operatively and selectively coupled to an engine and transmission, the system having a system controller for controlling the vehicle powertrain system which is in signal communication with and adapted to provide an output torque command to an engine controller for controlling the output torque of the engine, wherein the electric machine is adapted to provide an output torque to oppose rotation of the engine and provide and active engine stop, comprising:
   initiating an active engine stop request;
   defueling the engine in response to the active engine stop request and maintaining the rotation of the engine and a predetermined engine speed using the electric machine;
   determining a desired rate of reduction of the engine speed from the predetermined engine speed, wherein determining the desired rate of reduction comprises calculating an engine speed reduction trajectory for the engine;
   determining an electric machine output torque command necessary to obtain the engine speed reduction trajectory as a function of a plurality of vehicle dynamic parameters;
   applying the opposing torque using the electric machine to oppose the rotation of the engine and reduce the engine speed consistent with the desired rate of reduction of the engine speed;
   controlling the electric machine output torque using the electric machine output torque command;
   calculating an engine speed trajectory error using the engine speed trajectory reduction and an actual engine speed;
   determining an electric machine output torque command correction based on the trajectory error; and
   applying the electric machine output torque command correction to the electric machine output torque command.

2. The method of claim 1, wherein the active engine stop request comprises a manual request from an operator.

3. The method of claim 1, wherein controlling the output torque of the electric machine using the output torque command comprises open loop control.

4. The method of claim 1, wherein the method is adapted for execution as code in a computer of the vehicle powertrain system.

5. The method of claim 1, wherein the active engine stop request comprises an engine output torque command for zero engine output torque.

6. The method of claim 1, wherein defueling is performed for a predetermined deffieling interval prior to applying the opposing torque.

7. The method of claim 1, wherein the active engine stop request comprises an automatic request detennined by the system controller in response to a predetermined engine stop parameter.

8. The method of claim 7, wherein the engine stop parameter is selected from a group consisting of a vehicle speed that is less than a vehicle speed engine stop threshold and a door open indication.

9. The method of claim 1, wherein the engine speed reduction trajectory is calculated by dividing the negative of the predetermined engine speed by a predetermined speed reduction interval.

10. The method of claim 9, wherein the predetermined speed reduction interval comprises an interval from a time associated with initiating the active engine stop request and a time associated with an electric machine stop conmiand.

11. The method of claim 1, further comprising:
   removing the opposing torque of the electric machine at an engine speed greater than zero engine speed.

12. The method of claim 11, wherein the opposing torque is removed below a predetermined engine speed threshold.

13. The method of claim 12, wherein the predetermined engine speed threshold is less than a resonance speed of the vehicle powertrairi system.

14. A method of providing an active engine stop mode of operation for a vehicle powertrain system comprising a plurality of electric machines that are each operatively and selectively coupled to an engine and transmission through a corresponding clutch, the system having a system controller for controlling the vehicle powertrain system which is in signal communication with and adapted to provide an output torque command to an engine controller for controlling the output torque of the engine, wherein at least one of the plurality of the electric machines is adapted to provide an output torque to oppose rotation of the engine and provide an active engine stop, comprising:
- initiating an active engine stop request using the system controller;
- defueling the engine in response to the output torque command and maintaining the rotation of the engine and a predetermined engine speed using the at least one of the plurality of electric machines;
- determining a desired rate of reduction of the engine speed from the predetermined engine speed, wherein determining the desired rate of reduction comprises calculating an engine speed reduction trajectory for the engine;
- determining an electric machine output torque command necessary to obtain the engine speed reduction trajectory as a function of a plurality of vehicle dynamic parameters;
- applying the opposing torque using the at least one of the electric machines to oppose the rotation of the engine and reduce the engine speed consistent with the desired rate of reduction of the engine speed;
- controlling the electric machine output torque using the electric machine output torque command;
- calculating a trajectory error using the engine speed reduction trajectory and an actual engine speed;
- determining an output torque command correction based on the trajectory error; and
- applying the output torque command correction to the electric machine output torque command.

15. The method of claim 14, wherein the activeengine stop request comprises an engine output torque command for zero engine output torque.

16. The method of claim 14, wherein defueling is performed for a predetermined defueling interval prior to applying the opposing torque.

17. The method of claim 14, wherein controlling the output torque of the electric machine using the output torque command comprises open loop control.

18. The method of claim 14, wherein the plurality of vehicle dynamic parameters comprise a transmission input torque, input acceleration, and output acceleration and at least one clutch slip acceleration.

19. The method of claim 14, wherein the method is adapted for execution as code in a computer of the vehicle powertrain system.

20. The method of claim 14, wherein the engine speed reduction trajectory is calculated by dividing the negative of the predetermined engine speed by a predetermined speed reduction interval.

21. The method of claim 20, wherein the predetermined speed reduction interval comprises an interval from a time associated with initiating the active engine stop request and a time associated with an electric machine stop command.

22. The method of claim 14, further comprising:
- removing the opposing torque of the electric machine at an engine speed greater than zero engine speed.

23. The method of claim 22, wherein the opposing torque is removed below a predetermined engine speed threshold.

24. The method of claim 23, wherein the predetermined engine, speed threshold is less than a resonance speed of the engine and transmission.

25. A method for stopping rotation of an engine operatively connected to a powertrain comprising the engine and an electrical machine and an electro-mechanical transmission selectively operative to transmit torque therebetween, the method comprising:
- defueling the engine;
- determining a desired rate of reduction of engine speed;
- determining an output torque command to the electrical machine to achieve the desired rate of reduction of the engine speed;
- wherein the electric machine generates an output torque to oppose rotation of the engine and provides an active engine stop;
- calculating an engine speed trajectory error based upon the desired rate of reduction of the engine speed and an actual engine speed;
- determining a correction to the output torque command to the electric machine based on the engine speed trajectory error; and
- applying the correction to the output torque command to the electric machine.

26. The method of claim 25, wherein determining the correction to the output torque command to the electric machine based on the engine speed trajectory error comprises: inputting the engine speed trajectory error into a proportional-integral control scheme, and, determining a closed loop control term for the correction to the output torque command to the electrical machine.

* * * * *